US007561400B2

(12) United States Patent  (10) Patent No.: US 7,561,400 B2
Masghati et al.  (45) Date of Patent: Jul. 14, 2009

(54) BASE STATION PROTECTOR ASSEMBLY FOR SURGE PROTECTION

(75) Inventors: Mohammad Masghati, Carol Strea, IL (US); Richard Heidorn, Huntley, IL (US)

(73) Assignee: Illinois Tool Works Inc., Glenview, IL (US)

( * ) Notice: Subject to any disclaimer, the term of this patent is extended or adjusted under 35 U.S.C. 154(b) by 385 days.

(21) Appl. No.: 11/633,735

(22) Filed: Dec. 5, 2006

(65) Prior Publication Data

US 2008/0130185 A1    Jun. 5, 2008

(51) Int. Cl.
   *H02H 1/04*    (2006.01)
(52) U.S. Cl. ...................... 361/119; 361/117
(58) Field of Classification Search ........... 361/117, 361/118, 119
   See application file for complete search history.

(56) References Cited

U.S. PATENT DOCUMENTS 6,134,093 A * 10/2000 Masghati ............. 361/119
6,696,709 B2 * 2/2004 Casey et al. ............ 257/173
6,881,076 B2 * 4/2005 Baker ................. 439/76.1

\* cited by examiner

*Primary Examiner*—Danny Nguyen
(74) *Attorney, Agent, or Firm*—Mark W. Coll; Paul F. Donovan

(57) ABSTRACT

A base station protector assembly for protecting telecommunications related equipment and other associated sensitive electrical components from transient voltage and current surges includes a housing unit, a main printed circuit board disposed within the housing unit, header connectors mounted upon the main printed circuit board, an auxiliary printed circuit board mounted to the main printed circuit board via the header connectors, a plurality of surge protector networks, input side connector devices coupled to an unprotected side for connecting to incoming transmission lines, and output side connector devices coupled to the protected side for connecting to customers' electrical equipment to be protected. Each of the plurality of surge protector networks are mounted on the main and auxiliary printed circuit boards and are interconnected between the unprotected side and the protected side.

20 Claims, 7 Drawing Sheets

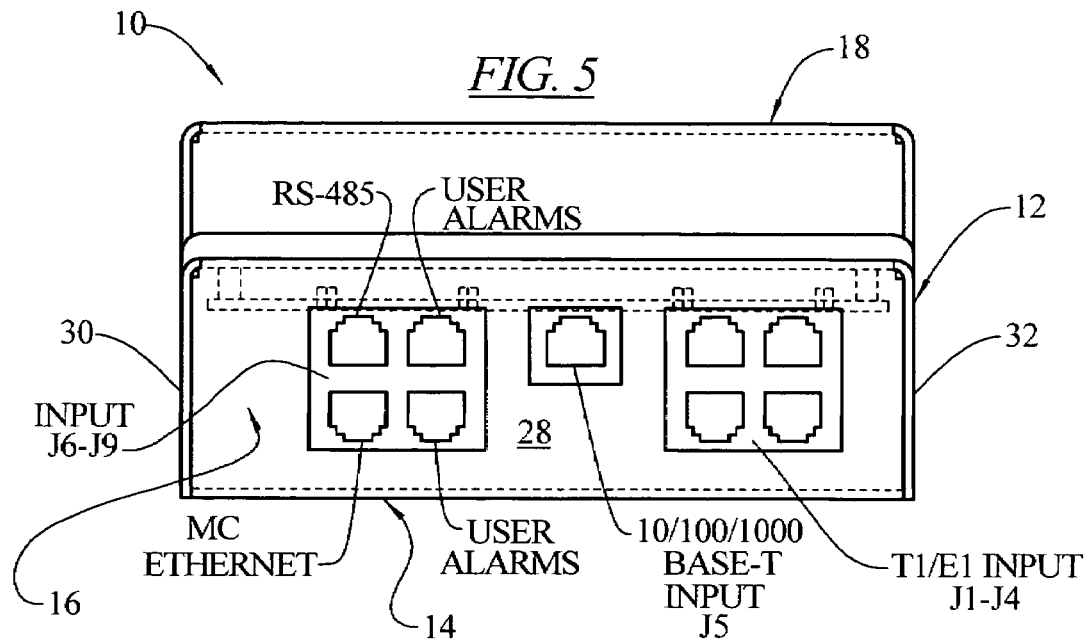
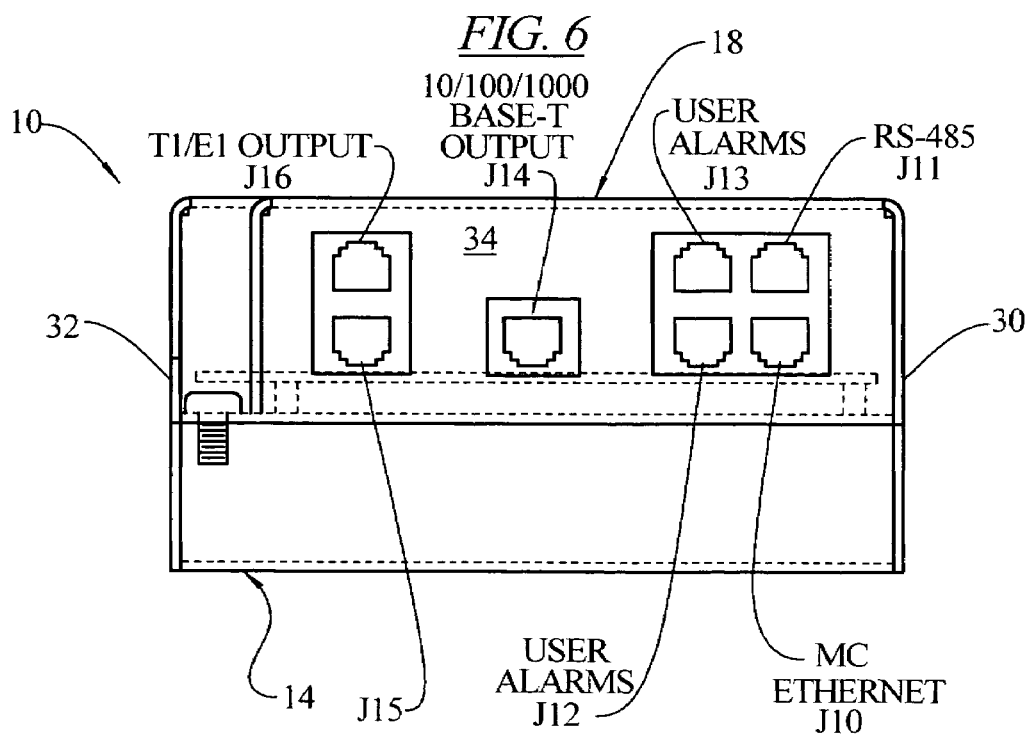

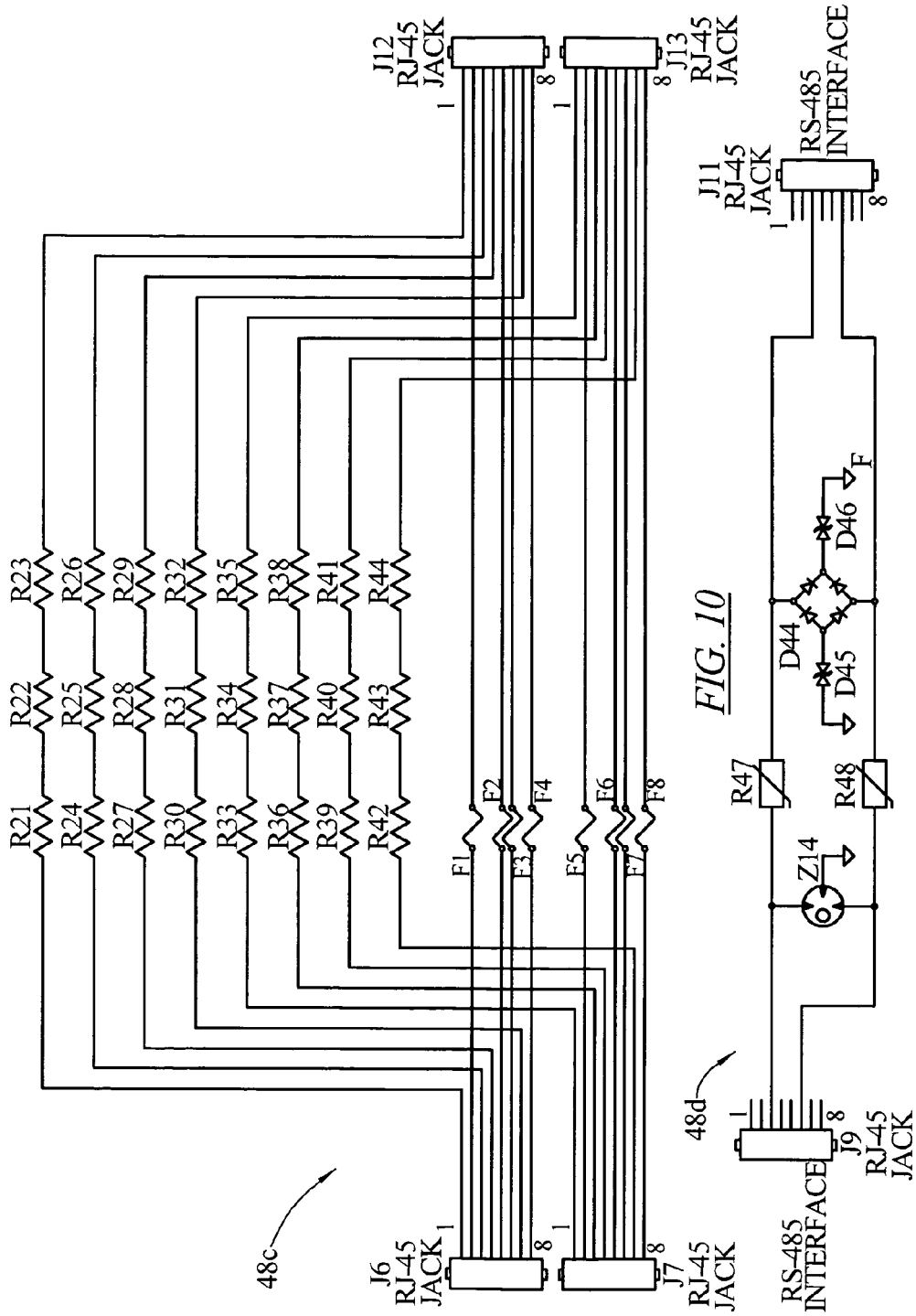

BASE STATION PROTECTOR ASSEMBLY FOR SURGE PROTECTION

BACKGROUND OF THE INVENTION

1. Field of the Invention

This invention relates generally to surge protection devices for protecting telecommunications related equipment and associated sensitive electrical components from transient voltage and/or current surges. More particularly, the present invention relates to an improved base station protector assembly for protecting telecommunications related equipment and associated sensitive electrical components from transient voltage and/or current surges occurring on power or transmission lines coupled thereto. Specifically, the base station protector assembly of the instant invention includes a uniquely designed housing unit which receives a main printed circuit board for mounting a portion of a plurality of primary/secondary protector networks therein, an auxiliary printed circuit board for mounting the current-limiting devices of the plurality of protector networks and for interconnection with the main printed circuit board, a plurality of exposed side grouped connector devices, and a plurality of protected side grouped connector devices.

2. Description of the Prior Art

As is generally well known to those skilled in the telecommunications industry, modern telecommunications equipment is susceptible to transient surges such as those caused by lightning strikes and other voltage surges on the transmission lines. Accordingly, various types of surge protector circuits are known in the prior art which have been provided for connection to the incoming transmission lines so as to be normally non-operative but are rendered active when a voltage/current surge exceeds a predetermined limit for protecting the sensitive equipment.

As used herein, the term "transmission lines" refers to various types of wires or conductors in a power distribution network provided by electric utility companies for carrying power, voice signals, data signals and the like to a users' or consumers' equipment. The voice/data signals may be used for transmitting and/or receiving signals to and from various types of office equipment, such as telephone sets, computers, facsimile machines, photocopiers, alarm devices, modems, or high-speed interface circuit devices (T-1 line, DSL network, Ethernet network, 10/100/1000 Base-T interface, etc.).

In the typical power distribution network, the transmission lines provided by the utility companies carrying the various incoming signals are fed to a base station router (not shown) which is used to separate these incoming signals for interconnection to the different kinds of consumers' sensitive electrical equipment. In order to prevent damage to such electrical equipment caused by transient voltage and/or current surges, the present base station protector assembly has particular application in being used for interconnection between the base station router and the different kinds of consumers' equipment.

SUMMARY OF THE INVENTION

Accordingly, it is a general object of the present invention to provide a base station protector assembly for protecting telecommunications related equipment and associated sensitive electrical components from transient voltage and/or current surges which is relatively simple and economical to manufacture and assemble.

It is an object of the present invention to provide a base station protector assembly for protecting telecommunications related equipment and associated sensitive electrical components from transient voltage and/or current surges which includes a uniquely-designed housing unit which is very compact in size so as to be suitable for receiving a plurality of primary/secondary protector networks therein.

It is another object of the present invention to provide a base station protector assembly for protecting telecommunications related equipment and associated sensitive electrical components from transient voltage and/or current surges which is characterized by a design wherein mounting holes are formed on opposite corners of a housing base member for facilitating securement to a standard footprint of a cabinet wiring panel used in a conventional power distribution network.

It is still another object of the present invention to provide base station protector assembly for protecting telecommunications related equipment and associated sensitive electrical components from transient voltage and/or current surges which includes a main printed circuit board for mounting a portion of a plurality of primary/secondary protector networks, an auxiliary printed circuit board for mounting the current-limiting devices of the plurality of protector networks and for interconnection with the main printed circuit board, a plurality of exposed side grouped connector devices, and a plurality of protected side grouped connector devices.

In a preferred embodiment of the present invention, there is provided a base station protector assembly for protecting telecommunications related equipment and other associated sensitive electrical components from transient voltage and current surges which includes a housing unit formed of a base member, a front cover member, a back cover member, and a top cover member all interconnected together so as to form an enclosure. A main printed circuit board is disposed within the enclosure of the housing unit. A pair of header connectors is mounted upon the main printed circuit board. An auxiliary printed circuit board is mounted vertically to the main printed circuit board via the pair of header connectors.

A plurality of surge protector networks is provided within the enclosure. Each of the plurality of surge protector networks is mounted on the main and auxiliary printed circuit boards and is interconnected between an unprotected side and a protected side. Input side connector devices are coupled to the unprotected side for connecting to incoming transmission lines. Output side connector devices are coupled to the protected side for connecting to customers' electrical equipment to be protected.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 5 is front view of the base station protector assembly of FIG. 1;

FIG. 6 is a rear view of the base station protector assembly of FIG. 1;

FIG. 9 is a schematic circuit diagram of one of the primary/secondary protector networks interconnected between the input side grouped connector devices J6-J7 and the output side grouped connector devices J12-J13;

FIG. 10 is a schematic circuit diagram of one of the primary/secondary protector networks interconnected between the input side grouped connector devices J9 and the output side grouped connector devices J11;

DESCRIPTION OF THE PREFERRED EMBODIMENTS

Figure 1:
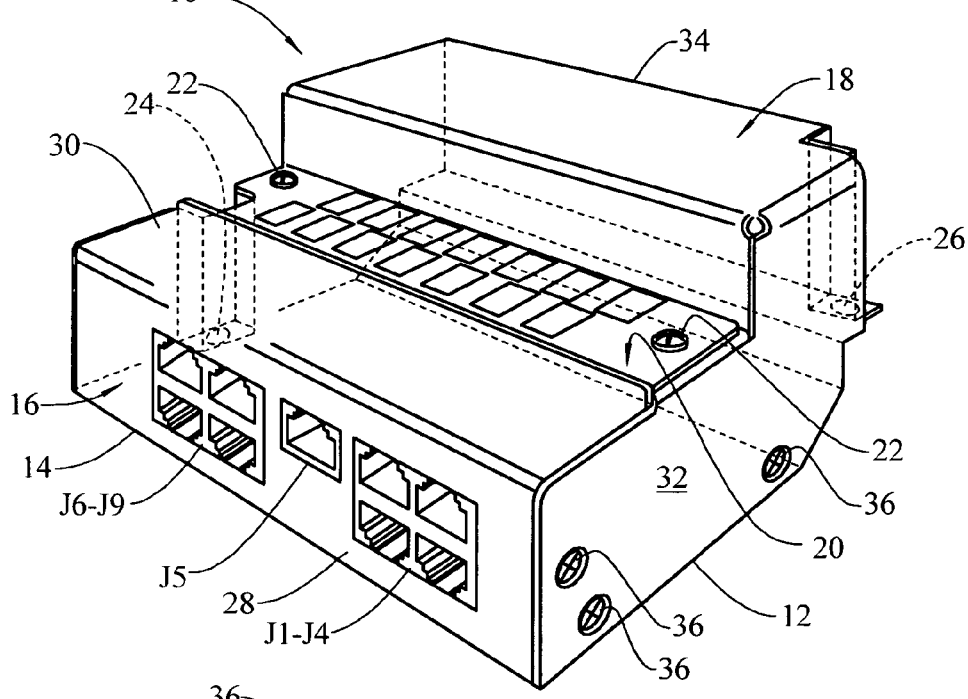
FIG. 1 is a perspective view of a base station protector assembly, constructed in accordance with the principles of the present invention.
Figure 2:
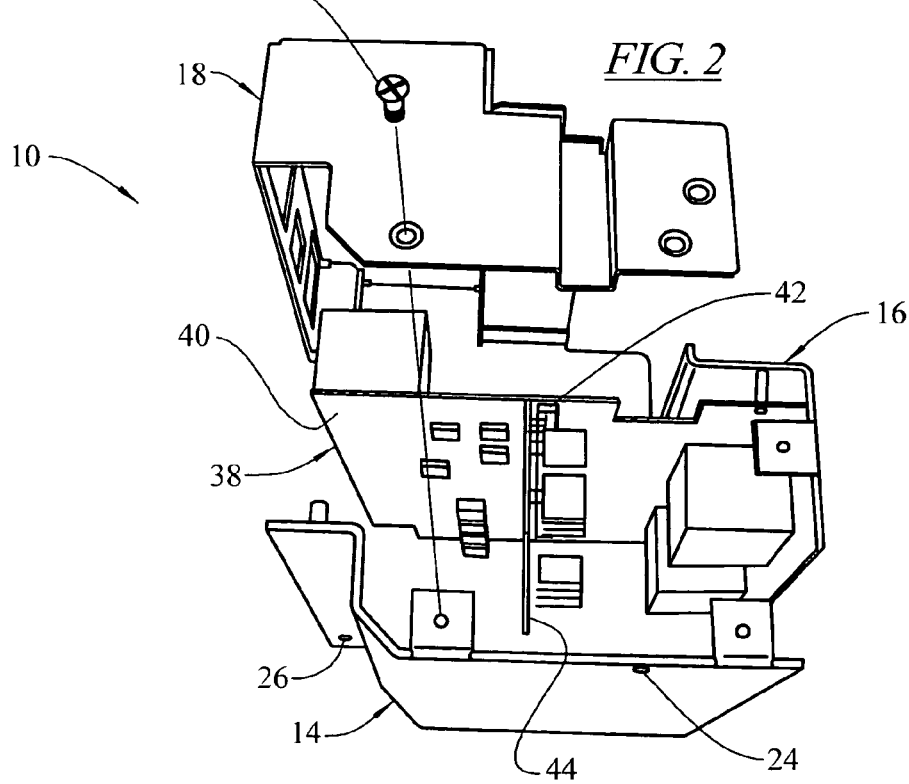
FIG. 2 is an exploded perspective view of the base station protector assembly of FIG. 1.

It is to be distinctly understood at the outset that the present invention shown in the drawings and described in detail in conjunction with the preferred embodiments is not intended to serve as a limitation upon the scope or teachings thereof, but is to be considered merely an exemplification of the principles of the present invention.

Referring now in detail to the various view of the drawings and in particular to FIGS. 1 through 6, there is illustrated an improved base station protector assembly 10 which is constructed in accordance with the principles of the present invention. It suitably fits into the standard footprint of a cabinet wiring panel for a power distribution network in common use in telecommunications related equipment. The improved base station protector assembly 10 has particular applications for use as a network interface for interconnection between a base station router (not shown) in the power distribution network and the different kinds of consumers' sensitive electrical equipment so as to protect the same from damage caused by transient voltage and/or current surges.

The improved base station protector assembly 10 includes a substantially rectangular-shaped housing unit 12 having a unique construction and made of a suitable metallic material, such as sheet metal and the like which is comprised of a base member 14, a front cover member 16, and a back cover member 18. Further, a top cover member 20 is made preferably of a phenolic material and is secured to a portion of the back cover member 18 by a pair of screws 22. When the screws 22 are removed, there is provided easy and quick access to the gas tubes which can then be replaced as required. The housing unit 12 is of a very compact size so as to accommodate a number of different primary/secondary protector networks in a very limited amount of space area and is adapted to be mounted in the standard footprint of the power distribution cabinet wiring panel by means of oppositely disposed upper and lower mounting apertures 24 and 26.

The housing further includes a front wall member 28, opposed side wall members 30 and 32, and a rear wall member 34. A plurality of screws 36 are provided on the side wall members 30, 32 so as to fixedly secure the front and back cover members 16, 18 to the base member 14. A plurality of first, second, and third grouped input or exposed side connector devices J1-J4, J5, and J6-J9 respectively are mounted in the front wall member 28 of the housing unit 12 which are adapted to receive the various incoming transmission lines carrying the various input power, data, or voice signals. A plurality of fourth, fifth, and sixth grouped output or protected side connector devices J10-J13, J14, and J15-J16 respectively are mounted in the rear wall member 34 of the housing unit 12 which are adapted for connection to the various sensitive electrical consumers' equipment to be protected (i.e., telephone sets, computers, fax machines, etc.).

As is illustrated in this particular embodiment, each of the input side connector devices J1-J4, J5, and J6-J9 is a standardized modular RJ-45 jack which is commercially available. Similarly, each of the output side connector devices J10-J13, J14, and J15-J16 is also a standardized modular RJ-45 jack. However, it should be clearly understood that other types of connector devices for either the input side or output side may be used. Each of the modular RJ-45 jacks is adapted to receive a standardized modular plug connectible to either the incoming transmission lines or the consumers' electrical equipment. The input and output connector devices provide for quick and easy mechanical interconnections of the present base station protector between the incoming transmission lines and the consumers' electrical equipment.

Figure 3:
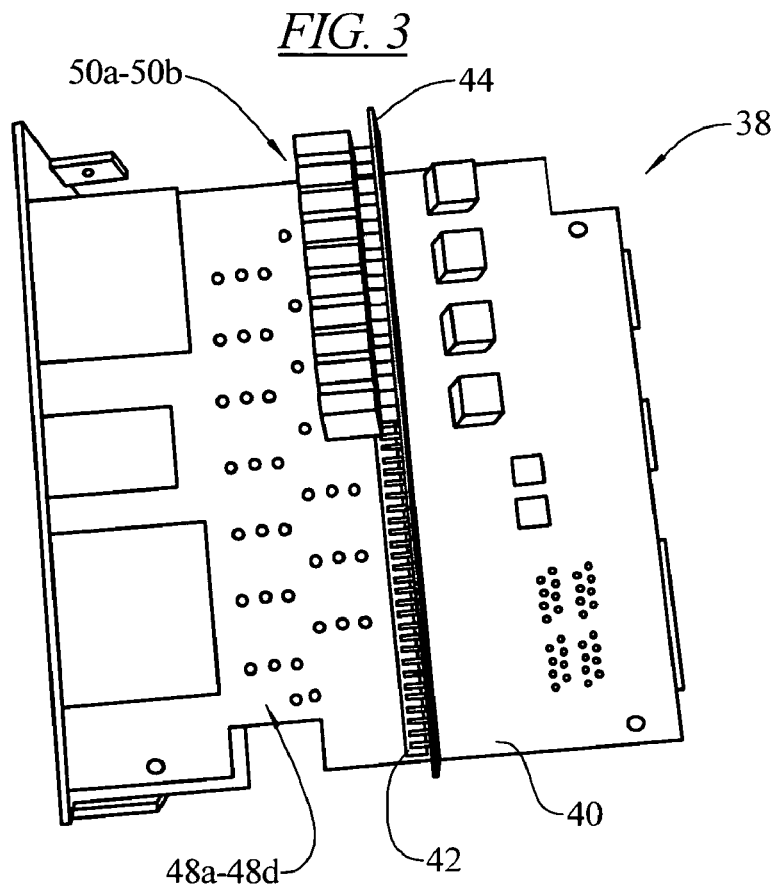
FIG. 3 is a perspective view of the printed circuit board sub-assembly of FIG. 1, with the cover members removed.
Figure 4:
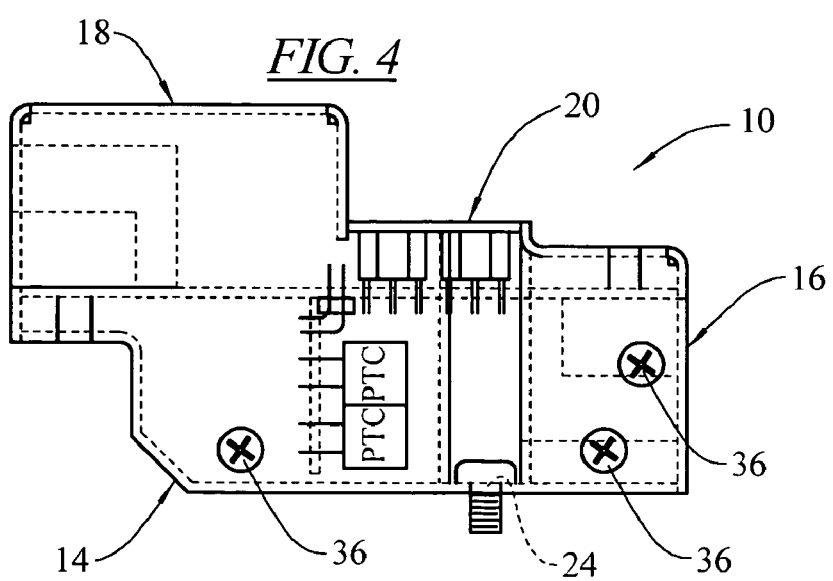
FIG. 4 is side elevational view of the base station protector assembly of FIG. 1.

The base member 14, front cover member 16, back cover member 18, and top cover member 20 are all joined together so as to form an enclosure for receiving a printed circuit board (PCB) sub-assembly 38, as best seen from FIG. 3. The PCB sub-assembly 38 includes a main printed circuit board 40, a pair of right angled header connectors 42, an auxiliary printed circuit board 44, the input side connector devices, and the output side connector devices.

The pair of right angled header connectors 42 are mounted on the underneath side of the main printed circuit board 40 in a substantially central portion thereof. The header connectors 42 include a plurality of contacts for effecting electrical connection with the main printed circuit board 40. The auxiliary printed circuit board 44 is designed to be mounted vertically or perpendicularly to the main printed circuit board 40 via the pair of right angled header connector 42 so as to reduce the amount of space area required. The main printed circuit board 40 is used for mounting a portion of a plurality of primary/secondary protector networks 48a-48d. The auxiliary printed circuit board 44 is used for mounting various current-limiting devices 50a-50b of the plurality of primary/secondary protector networks 48a-48d. A schematic circuit diagram of one of the plurality of primary/secondary protector networks 48a interconnected between the first grouped input side connector devices J1-J4 and the fourth grouped output side connector devices J15-J16 is illustrated in FIG. 7 of the drawings.

Figure 7:
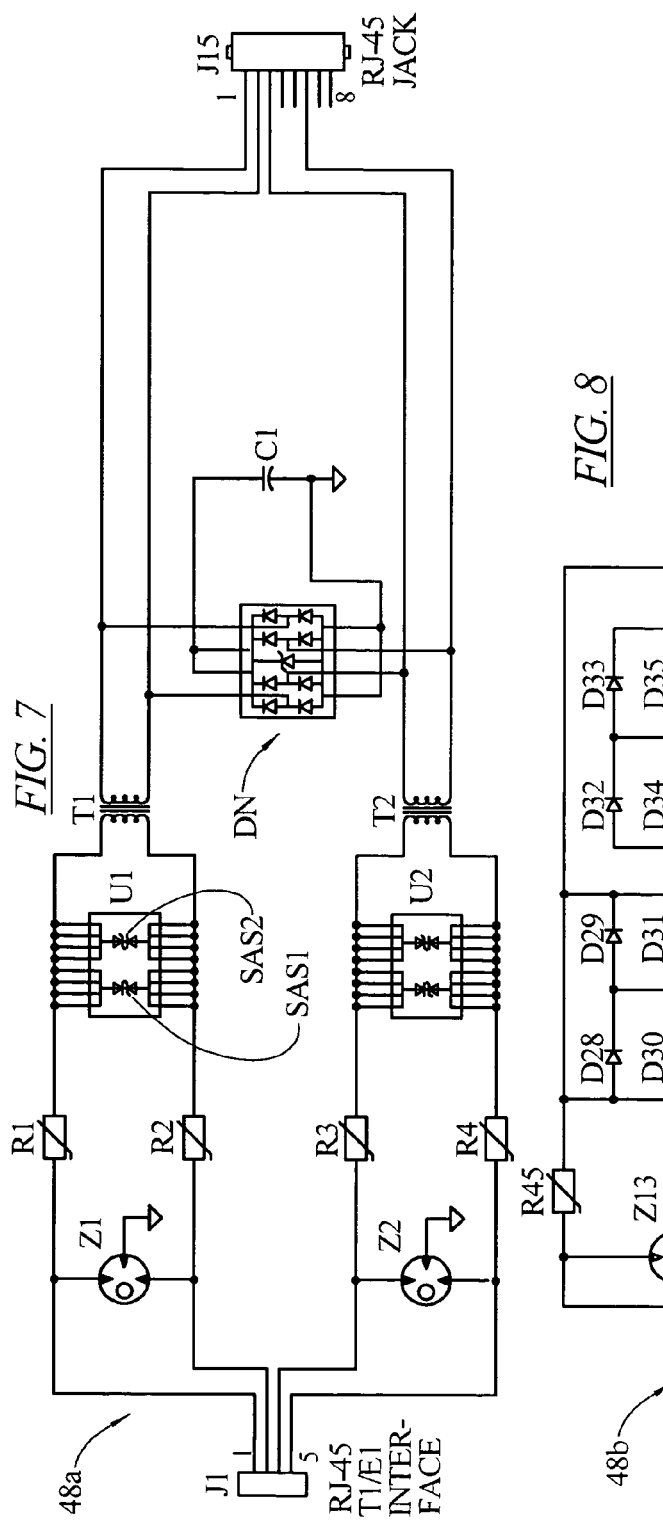
FIG. 7 is a schematic circuit diagram of one of the primary/secondary protector networks interconnected between the input side grouped connector devices J1-J4 and the output side grouped connector devices J15-J16.

As can be seen from FIG. 7, the primary/secondary protector network 48a is comprised of a gas tube Z1, a pair of positive temperature coefficient (PTC) resistors R1, R2, a pair of voltage suppressors SAS1, SAS2, a transformer T1 having a primary winding and a secondary winding, a diode network DN, and a capacitor C1. The input side of the protector network 48a is connectable between two wires of the incoming transmission lines applied across input pins 1 and 2 of the RJ-45 jack J1 defining an unprotected side. The output side of the protector network 48a is connectable between two wires of a customers' electrical equipment to be protected applied across output pins 1 and 2 of the RJ-45 jack J15 defining a protected side.

In the preferred embodiment, the gas tube Z1 is similar to the type 3YVJ-260J1F2 and the voltage suppressors SAS1, SAS2 are silicon avalanche suppressors similar to the type LC01-6. Further, PTC resistors R1, R2 are similar to TR600-160-RA-B-0.5-0.13 and the diode network DN is similar to SRDA3.3-4.

Figure 8:
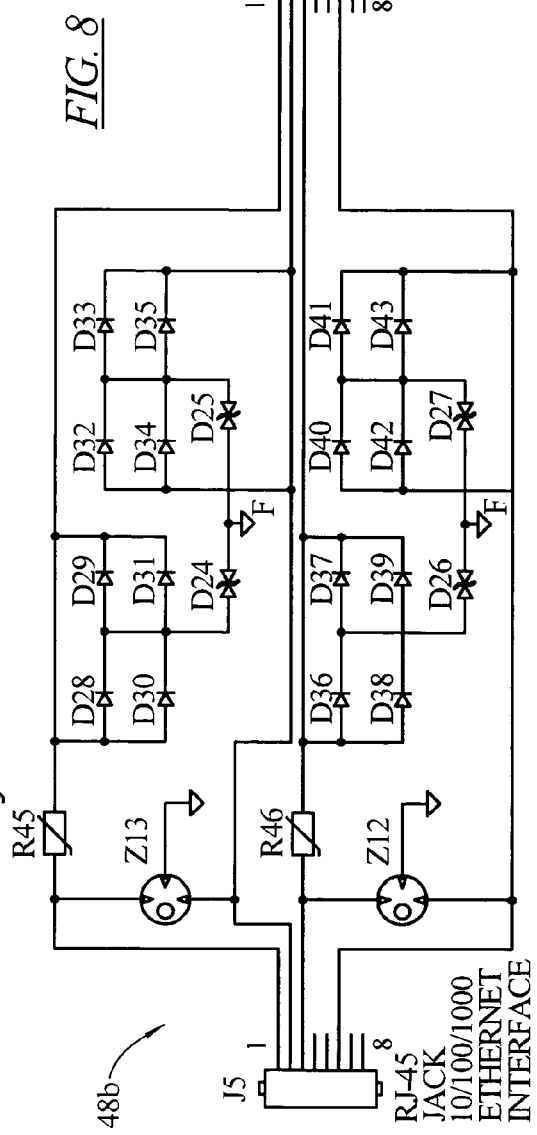
FIG. 8 is a schematic circuit diagram of one of the primary/secondary protector networks interconnected between the input side grouped connector devices J5 and the output side grouped connector devices J14.

A schematic circuit diagram of one of the plurality of primary/secondary protector networks 48b interconnected between the second grouped input side connector devices J5 and the fifth grouped output side connector devices J14 is illustrated in FIG. 8 of the drawings.

As can be seen from FIG. 8, the primary/secondary protector network 48b is comprised of a gas tube Z13, a positive temperature coefficient (PTC) resistor R45, a pair of voltage suppressors D24, D25, and diodes D28-D35. The input side of the protector network 48b is connectable between two wires of the incoming transmission lines applied across input pins 1 and 2 of the RJ-45 jack J5 defining the unprotected side. The output side of the protector network 48b is connectable between two wires of a customers' electrical equipment to be protected applied across output pins 1 and 2 of the RJ-45 jack J14 defining the protected side.

In FIG. 9, there is shown a schematic circuit diagram of the protector network 48c interconnected between the third grouped input side connector devices J6-J7 and the sixth grouped output side connector devices J12-J13. The protector network 48c is comprised of a plurality of series resistors R21-R23 through R42-R44 and a plurality of fuses F1 through F8. The input side of the protector network 48c is connectable to the incoming transmission lines applied across input pins 1-8 of the RJ-45 jacks J6-J7 defining the unprotected side. The output side of the protector network 48c is connectable to a customers' electrical equipment to be protected applied across output pins 1-8 of the RJ-45 jack J12-J13 defining the protected side.

A schematic circuit diagram of one of the plurality of primary/secondary protector networks 48d interconnected between the third grouped input side connector device J9 and the sixth grouped output side connector device J11 is illustrated in FIG. 10 of the drawings.

As can be seen from FIG. 10, the primary/secondary protector network 48d is comprised of a gas tube Z14, a pair of PTC resistors R47 and R48, a pair of silicon avalanche suppressors D45, D46, and a diode bridge D44. The input side of the protector network 48d is connectable to the incoming transmission lines applied across input pins 3-6 of the RJ-45 jack J9 defining the unprotected side. The output side of the protector network 48d is connectable to a customers' electrical equipment to be protected applied across output pins 3-6 of the RJ-45 jack J11 defining the protected side.

Figure 11:
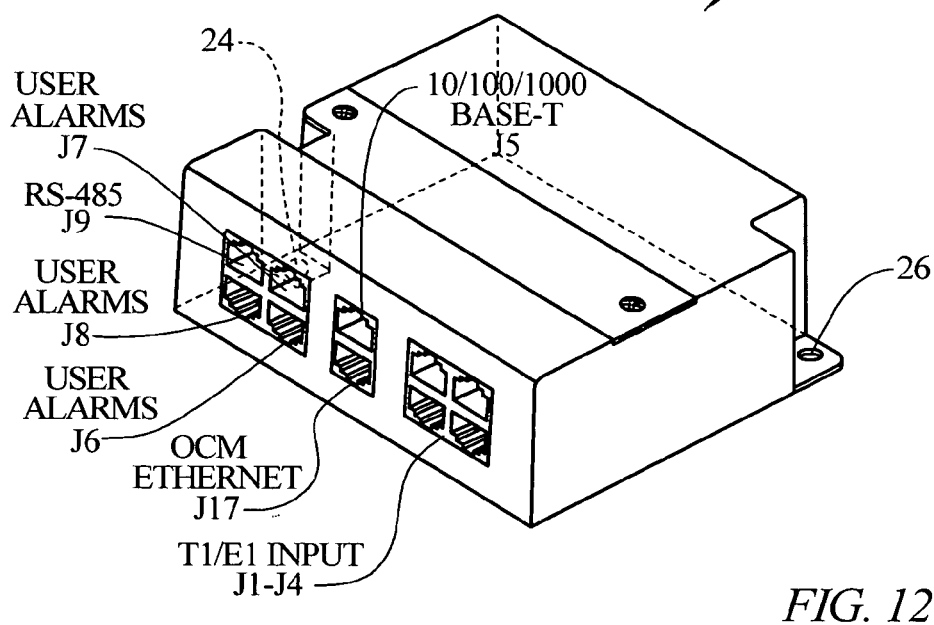
FIG. 11 is a perspective view of a second embodiment of a base station protector assembly, constructed in accordance with the principles of the present invention.
Figure 12:
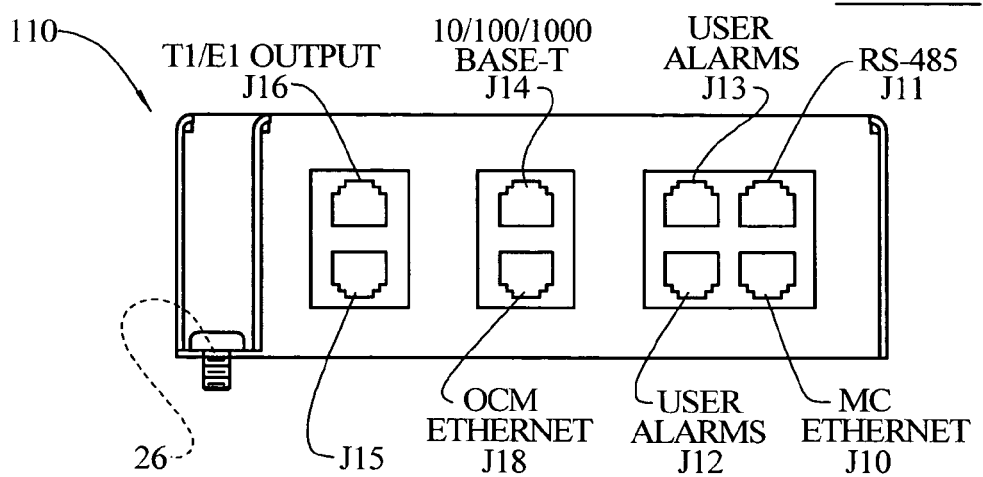
FIG. 12 is a rear view of the base station protector assembly of FIG. 1.
Figure 13:
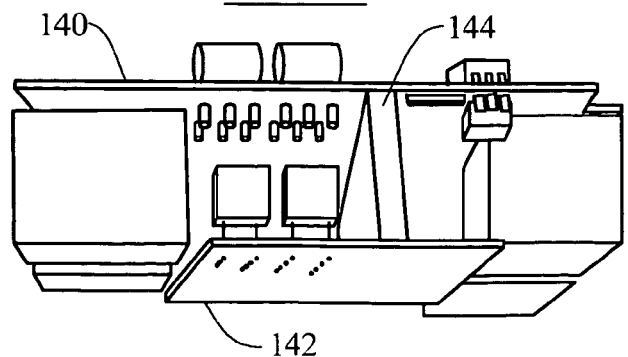
FIG. 13 is a perspective view of the printed circuit board sub-assembly of FIG. 11, with the cover members removed.

In FIGS. 11 through 13, there is illustrated a second embodiment of a base station protector assembly 110 which is constructed in accordance with the principles of the present invention. The base station protector assembly 110 is substantially identical to the protector assembly 10 of FIG. 1, except that the second grouped input side connector devices includes an additional RJ-45 jack J17 and the fifth grouped output side connector devices includes an additional RJ-45 jack J18 as is illustrated in FIGS. 11 and 12. Additional primary/secondary surge protector networks are interconnected between the RJ-45 jacks J17 and J18. Also, the auxiliary printed circuit board 142 is mounted parallel rather than perpendicular to the main printed circuit board 140 via the head connectors 144 for reducing the amount of space area required.

Figure 14:
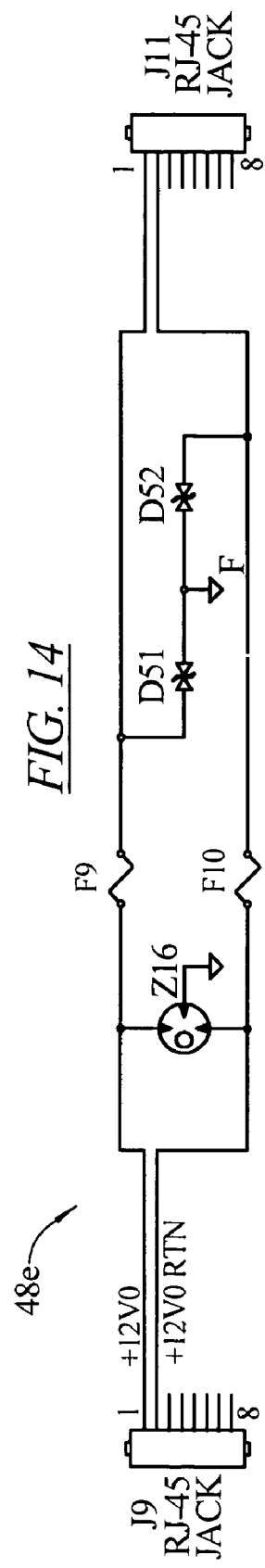
FIG. 14 is a schematic circuit diagram of one of the primary/secondary protector networks interconnected between the input side grouped connector devices J9 and the output side grouped connector devices J11 in the second embodiment of the base station assembly 110 of FIG. 11.

In FIG. 14 of the drawings, there is illustrated a schematic circuit diagram of one of the plurality of primary/secondary protector networks 48e interconnected between the third grouped input side connector device J9 and the sixth grouped output side connector device J11 in the second embodiment of the base station protector assembly 110 of FIG. 11.

As can be seen from FIG. 14, the primary/secondary protector network 48e is comprised of a gas tube Z16, a pair of fuses F9 and F10, and a pair of silicon avalanche suppressors D51, D52. The input side of the protector network 48e is connectable to the incoming transmission lines (supplying a +12 volts) applied across input pins 1-2 of the RJ-45 jack J9 defining the unprotected side. The output side of the protector network 48e is connectable to a customers' electrical equipment to be protected applied across output pins 1-2 of the RJ-45 jack J11 defining the protected side. It should be understood that the primary/secondary protector network 48e functions as a power protection scheme which is specifically used for +12 volt auxiliary power feed applications. The +12 volt power supply is typically use to power alarm circuitry, LED indicator panels and the like.

From the foregoing detailed description, it can thus be seen that the present invention provides a base station protector assembly for protecting telecommunications related equipment and other associated sensitive electrical components from transient voltage and current surges which includes a housing unit, a main printed circuit board, header connectors, and an auxiliary printed circuit board mounted either vertically or parallel to the main printed circuit board via header connectors so as to reduce space area requirements. The protector assembly further includes a plurality of surge protector networks mounted on the main and auxiliary printed circuit boards, input side connector devices coupled to an unprotected side for connecting to incoming transmission lines, and output side connector devices coupled to the protected side for connecting to customers' electrical equipment to be protected.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A base station protector assembly for protecting telecommunications related equipment and other associated sensitive electrical components from transient voltage and current surges, comprising:

a housing unit formed of a base member, a front cover member, a back cover member, and a top cover member all interconnected together so as to form an enclosure;

a main printed circuit board disposed within said enclosure of said housing unit;

a pair of header connectors formed on said main printed circuit board;

an auxiliary printed circuit board mounted vertically to said main printed circuit board via said pair of header connectors;

a plurality of surge protector networks, each of said plurality of surge protector networks being formed on said main and auxiliary printed circuit boards and interconnected between an unprotected side and a protected side;

input side connector means coupled to said unprotected side for connecting to incoming transmission lines; and output side connector means coupled to said protected side for connecting to customers' electrical equipment to be protected.

2. A base station protector assembly as claimed in claim 1, wherein said input side connector means includes a plurality of grouped exposed side connector devices.

3. A base station protector assembly as claimed in claim 2, wherein each of said plurality of grouped exposed side connector devices includes RJ-45 jacks.

4. A base station protector assembly as claimed in claim 3, wherein said output side connector means includes a plurality of grouped protected side connector devices.

5. A base station protector assembly as claimed in claim 4, wherein each of said plurality of grouped protected side connector devices includes RJ-45 jacks.

6. A base station protector assembly as claimed in claim 1, wherein each of said plurality of surge protector networks includes voltage suppressor means and current-limiting means.

7. A base station protector assembly as claimed in claim 6, wherein said voltage suppressor means is formed of a gas discharge tube.

8. A base station protector assembly as claimed in claim 6, wherein said current-limiting means is formed of a pair of positive temperature coefficient resistors.

9. A base station protector assembly as claimed in claim 6, wherein said current-limiting means is formed of a pair of fuses.

10. A base station protector assembly as claimed in claim 1, wherein said base member of said housing unit includes opposed mounted means which is adapted to fit into the footprint of a cabinet wiring panel of conventional power distribution network.

11. A base station protector assembly for protecting telecommunications related equipment and other associated sensitive electrical components from transient voltage and current surges, comprising:

housing means formed of a base member, a front cover member, a back cover member, and a top cover member all interconnected together so as to form an enclosure;

main printed circuit board means disposed within said enclosure of said housing means;

header connector means formed on said main printed circuit board means;

auxiliary printed circuit board means mounted to said main printed circuit board means via said header connector means;

surge protector means being formed on said main and auxiliary printed circuit board means and interconnected between an unprotected side and a protected side;

input side connector means coupled to said unprotected side for connecting to incoming transmission lines; and output side connector means coupled to said protected side for connecting to customers' electrical equipment to be protected.

12. A base station protector assembly as claimed in claim 11, wherein said input side connector means includes a plurality of grouped exposed side connector devices.

13. A base station protector assembly as claimed in claim 12, wherein said output side connector means includes a plurality of grouped protected side connector devices.

14. A base station protector assembly as claimed in claim 11, wherein said surge protector means includes voltage suppressor means and current-limiting means.

15. A base station protector assembly as claimed in claim 14, wherein a portion of said surge protector means is mounted on said main printed circuit board means.

16. A base station protector assembly as claimed in claim 14, wherein said current-limiting means is mounted on said auxiliary printed circuit board means.

17. A base station protector assembly as claimed in claim 14, wherein said current-limiting means is formed of a pair of positive temperature coefficient resistors.

18. A base station protector assembly as claimed in claim 11, wherein said base member of said housing means includes opposed mounted means which is adapted to fit into the footprint of a cabinet wiring panel of conventional power distribution network.

19. A base station protector assembly as claimed in claim 11, wherein said auxiliary printed circuit board means is mounted vertically to said main printed circuit board means so as to reduce the amount of space area required.

20. A base station protector assembly as claimed in claim 11, wherein said auxiliary printed circuit board means is mounted parallel to said main printed circuit board means so as to reduce the amount of space area required.

* * * * *